United States Patent [19]
Desmarais et al.

[11] Patent Number: 5,123,592
[45] Date of Patent: Jun. 23, 1992

[54] PRESSURE INDEPENDENT CONTROL FOR AIR DISTRIBUTION SYSTEM

[75] Inventors: Brett A. Desmarais; Jeffrey S. Gilbert, both of Clay, N.Y.

[73] Assignee: Carrier Corporation, Syracuse, N.Y.

[21] Appl. No.: 676,504

[22] Filed: Mar. 28, 1991

[51] Int. Cl.⁵ .................................... F24F 13/10
[52] U.S. Cl. ........................... 236/493; 137/486; 137/487.5
[58] Field of Search ................ 236/49.3, 49.4, 78 D; 137/486, 487.5

[56] References Cited

U.S. PATENT DOCUMENTS

| | | | |
|---|---|---|---|
| 4,026,321 | 5/1977 | Kahoe et al. | 137/487.5 X |
| 4,375,224 | 3/1983 | Noll | 137/486 |
| 4,643,353 | 2/1987 | Harris | 137/486 X |
| 4,705,066 | 11/1987 | Gut et al. | 137/486 |
| 4,844,149 | 7/1989 | Dreibelbis et al. | 236/49.3 X |
| 4,909,308 | 3/1990 | Dreibelbis et al. | 236/49.4 X |
| 4,928,728 | 5/1990 | Nakane et al. | 137/486 |

*Primary Examiner*—William E. Tapolcai

[57] ABSTRACT

An air terminal adjustment method to achieve an air flow setpoint wherein the time to achieve the setpoint is determined by calculating the difference between the flow setpoint and an actual flow and then dividing the difference by a change in flow per unit time. The time to achieve the setpoint adapts to changes in static pressure in the air terminal.

2 Claims, 5 Drawing Sheets

PRESSURE INDEPENDENT CONTROL FOR AIR DISTRIBUTION SYSTEM

BACKGROUND OF THE INVENTION

This invention relates generally to variable air volume air distribution systems for delivering conditioned air through supply air ducts to an area or space in response to a sensed condition, and more particularly, to a control for determining and maintaining a desired flow of conditioned air into a space irrespective of the pressure in a supply air duct.

The utilization of variable air volume (VAV) air distribution systems to supply conditioned air from a central source thereof to offices, school rooms, and other similar spaces or areas in multi-room buildings has become increasingly more prevalent. Such VAV systems generally furnish constant temperature air from an outlet into the space, while varying the volume of air furnished into a space in accordance with the zone temperature demands. The flow of conditioned air from the outlets is generally regulated by operation of suitable damper means controlled by a thermostat sensing the temperature of the space being conditioned. Thus as the temperature of the space deviates to a greater degree from a predetermined set point, a greater quantity of conditioned air is discharged into the space. Conversely, when the temperature in the space being conditioned approaches the set point, the quantity of conditioned air discharged into the space is reduced. Thus, the system varies the air volume to the space depending upon the deviation of the actual space temperature from the desired set point. In U.S. Pat. No. 4,756,474 assigned to the same assignee as the present invention there is described a controller for a duct pressure power air terminal unit having a volume controller which receives two pressure signals, whereby the controller bleeds one pressure signal so as to control the inflation of a bellows to thereby modulate the terminal unit to maintain a constant volume air flow through the unit. The controller bleeds the second pressure signal so as to maintain at least a minimum flow through the unit. The above-identified controller is an improvement over U.S. Pat. No. 4,120,453 which describes a three-way valve controller having two pressure regulators and a bleed type thermostat which provide four input signals to the three-way valve thereby providing a single pressure signal to the inflatable bellows.

Since the air terminals in the aforementioned patents are powered by static pressure in the duct and a continuous fill and bleed of the bladder to maintain a desired space temperature, the static pressure in the duct is continually changing as the bladder fills and bleeds and changes the flow through the terminal. Further, under normal operating conditions the air terminals closer to the central source have a higher static pressure than air terminals more distant from the central source. These differences in duct static pressure affect the rate of change of the damper. Since, these units are designed to have a single optimum rate of change in flow for control and since the static pressure within the duct changes they become under-damped and unstable at high duct pressures and become over-damped and unstable at low duct pressures.

Thus there is a clear need for a method and apparatus to maintain stable control of a damper at all duct pressures. However, no previously proposed air distributing unit controllers have incorporated any means to ensure efficient steady state operation of the unit while delivering the correct amount of conditioned air with respect to a desired air flow.

SUMMARY OF THE INVENTION

Accordingly, it is an object of the present invention to provide a damper control means for an air terminal which determines the time to achieve a flow setpoint and adjusts the flow through the air terminal to achieve the desired flow.

It is another object of the present invention to provide an air terminal means having a damper mechanism which provides a desired conditioned air flow at any duct static pressure without the use of a pressure sensor.

These and other objects of the present invention are obtained by means of an air terminal control which measures an initial rate of change of flow through the air terminal from an actual flow condition to determine the time necessary to reach a desired flow. In the embodiment described the amount of time to reach a desired flow (T) is calculated according to the relation:

$$T = \frac{\text{Error}}{K}$$

where K is the initial change in flow divided by initial change in time, and Error is the difference between the actual initial flow and the desired flow.

BRIEF DESCRIPTION OF THE DRAWINGS

Other objects and advantages of the present invention will be apparent from the following detailed description in conjunction with the accompanying drawings forming a part of the specification in which reference numerals shown in the drawings designate like or corresponding parts throughout the same, and in which.

DESCRIPTION OF THE PREFERRED EMBODIMENT

Figure 1:
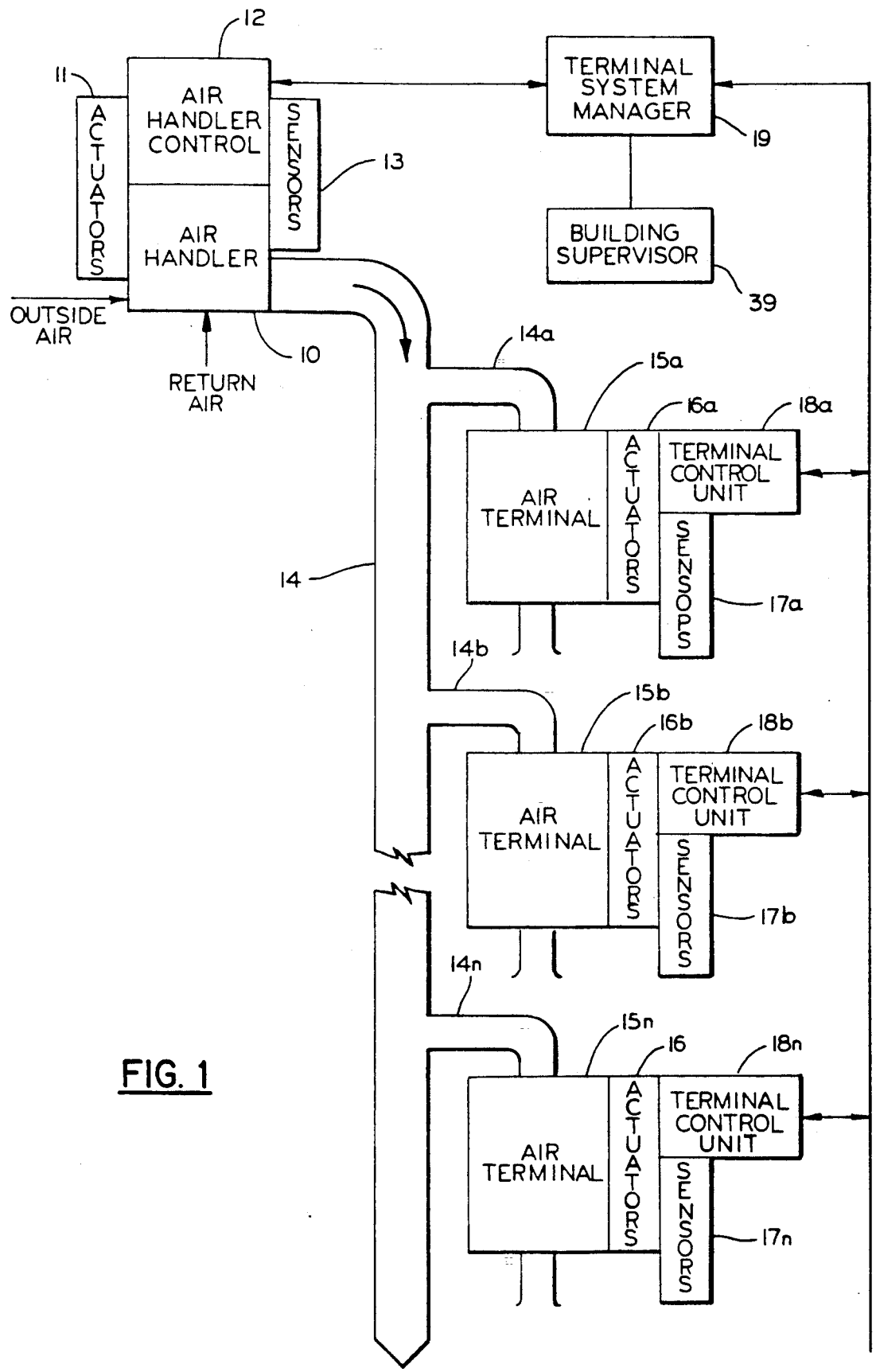
FIG. 1 is a diagrammatic representation of an air system that embodies the principles of the present invention.

FIG. 1, the numeral 10 generally designates an air source, such as an air handler which includes a fan, coil(s) and an electric or hot water heater. The air handler 10 receives return air and/or outside air which it delivers to duct 14. Actuators 11 control the outside and return air dampers for controlling the amounts of return and/or outside air. The air handler control 12 controls the air handler 10 by controlling the fan speed, coil(s) and heater, as is known. Sensors 13 detect the speed of the supply air temperature fan, as measured, for example by the motor power for energizing the coil and heaters. The conditioned air supplied to duct 14 is, in turn, supplied to branch lines 14a-n which supply terminals 15a-n, respectively. Terminals 15a-n may be the inflatable bellows damper type in which plenum air is used to inflate, and thereby close, the bellows and to deflate, and thereby open, the bellows, or of the damper blade type in which an actuator opens and closes the damper blade, or similar dampers. Actuators 16a-n control the inflation of the bellows or movement of the damper blade or the like as is well known in the art. Sensors 17a-n respectively, sense the space temperature which is supplied to terminal control units 18a-n, respectively. Terminal control units 18a-n contain the logic for controlling the actuators 16a-n based upon the space temperature data supplied by sensors 17a-n and the space temperature setpoint, which may be locally set at the terminal control units 18a-n or remotely at the building supervisor 39 and inputed to the terminal system manager 19. Space temperature control is maintained at the setpoint (within a tolerance) through the modulation of air flow through the air terminal. The terminal system manager 19 which contains occupancy schedules, temperatures, setpoints, etc., controls the air handler and terminal control unit and monitors alarms for the entire system.

Figure 2:
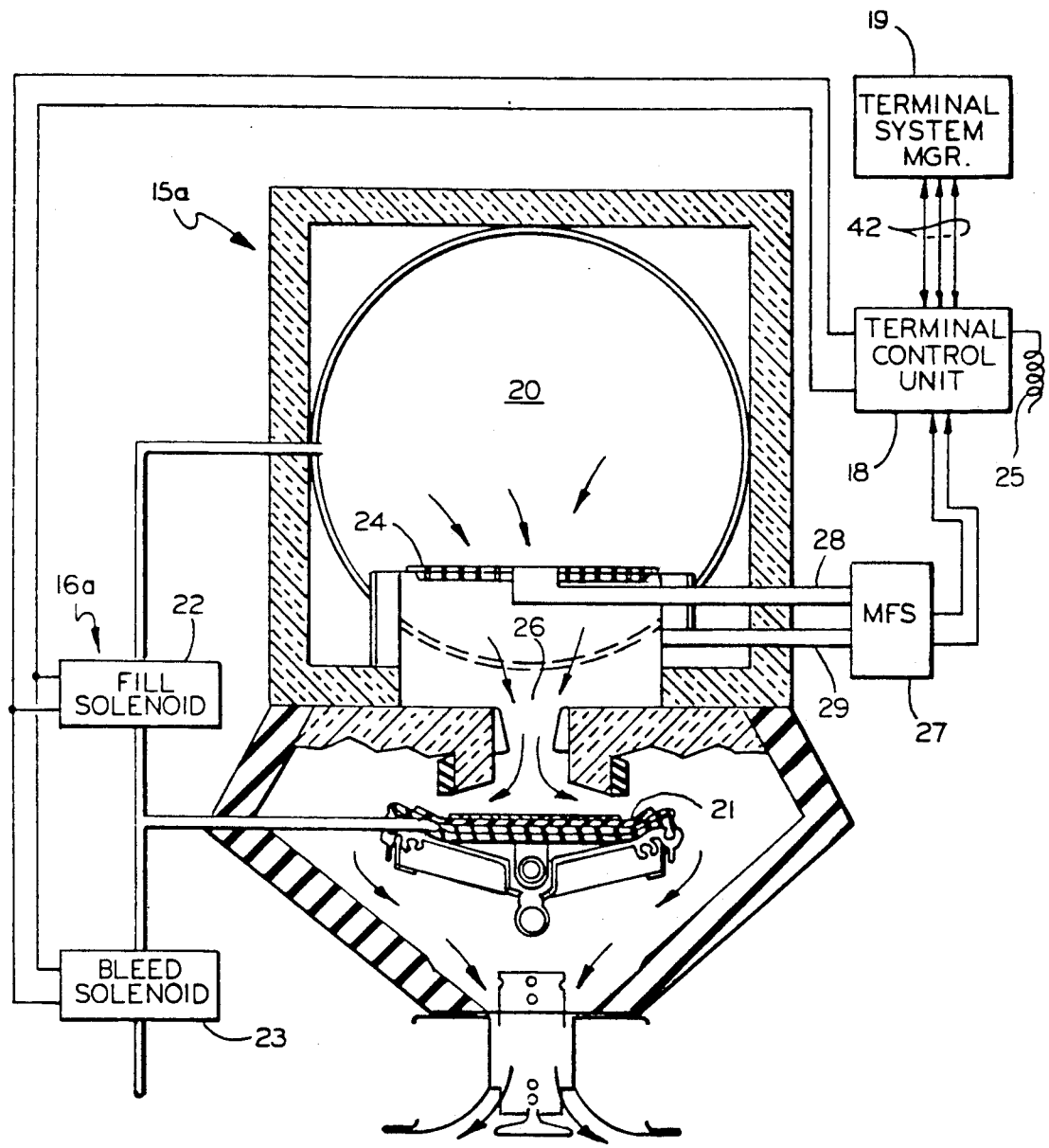
FIG. 2 is a diagrammatic representation of one embodiment of an air terminal employing the present invention.

Referring now specifically to FIG. 2 for the details of one embodiment of terminal 15a, line 14a supplies air to plenum 20. Air flows from plenum 20 through supply distribution plate 24 having a plurality of openings therein, under the control of bellows 21 to low pressure plenum 26. High pressure air from plenum 20 is connected by way of line 28 to mass flow sensor (MFS) 27, and low pressure air from below distribution plate 24 also flows, by way of line 29 to mass flow sensor. Actuators 16a include fill solenoid 22 which controls the filling or inflation of the bellows and bleed solenoid 23 which controls the bleeding or exhausting of bellows 21. Sensors 17a includes either integral room temperature sensor 25 or a remote temperature sensor (not illustrated) mass air flow sensor 27, and the temperature setpoint logic and control is included in terminal system manager 19. The terminal control unit 18 would include a conventional power supply and a communications port which, by way of lines 42, would send the room temperature to terminal system manager 19 and would receive conservation strategies, e.g. night setback and occupancy schedules.

Terminal system manager 19 provides data communication to air handler control 12 and terminal control units 18a-n. In this way terminal control units 18a-n are told when to change over to the other logic when changing between heating and cooling, when, and for how long, to open/close the terminals 15a-n, etc. The air handler control 12 further receives information as to how far to reset the coil temperature, whether to change fan speed, etc.

Figure 3:
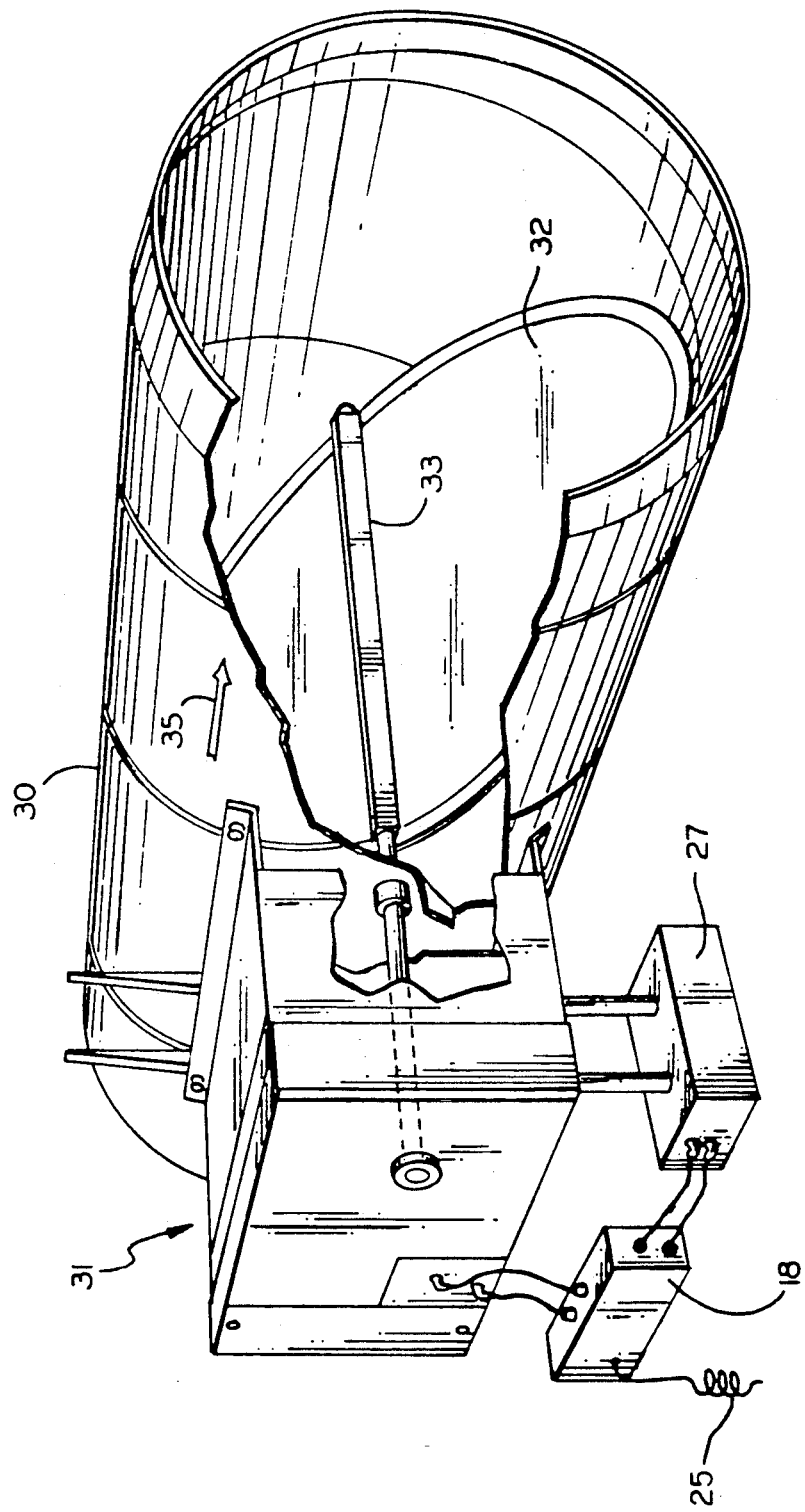
FIG. 3 is a perspective view of another embodiment of an air damper employing the present invention.

Referring now to FIG. 3, there is shown another embodiment of the present invention used in connection with a duct damper 30. The elongated duct 30 is of tubular construction and, as illustrated, is of cylindrical configuration. However, the shape and configuration and the size of the duct may vary depending upon the installation requirements. The duct 30 is provided with a directional arrow 35 indicating the direction of air flow longitudinally through the duct 30 and a direct coupled actuator 31 is mounted externally of the duct 14 in order to pivot the damper blade 32 about a central lateral or transverse shaft 35 which extends diametrically of the longitudinal axis of duct 14. The direct coupled actuator may be a model ML6161 manufactured by Honeywell, Inc. It is preferred that the damper blade 32 be elliptical so that there is a 60° pivoting of the blade between fully open and fully closed positions to, among other advantages, minimize travel of the actuating arm, as hereinafter described. Thus, the duct may be installed in any position in the duct 14 with the air flow arrow 20 oriented in the direction of air flow of duct 14 toward the zone being controlled. The direct coupled actuator 31 receives signals (open/close) from the terminal control unit 18 which in turn receives a differential pressure signal of the air flowing in the duct 30 from mass air flow sensor 27 and temperature signal from room temperature sensor 25.

Figure 4:
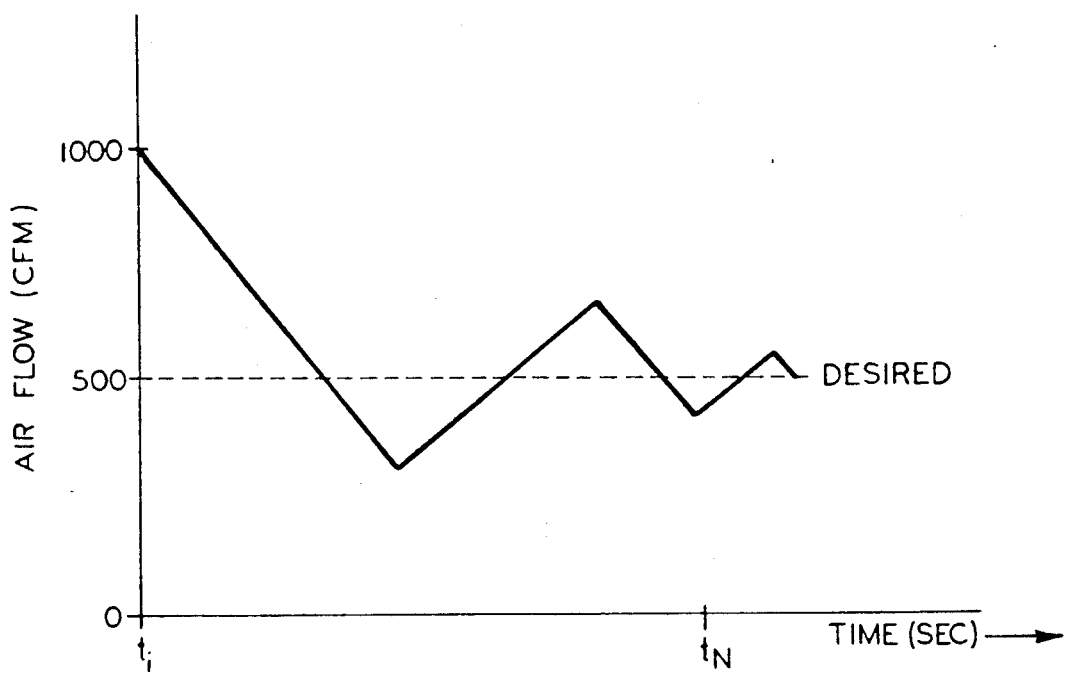
FIG. 4 is a graph showing the relation of air flow to time through a conventional air damper with a fixed rate of change of air flow.

FIG. 4 shows that control of an air terminal of conventional design is difficult. In operation, assume the air flow is required to change from an actual flow of 1000 cfm at an initial time, to a desired flow of 500 cfm, because the conditions, e.g. temperature, in the space to be conditioned has changed. Air flow is accomplished by adjusting the damper/bellows to achieve the desired (setpoint) flow. Since the damper has a single rate of change of flow at a nominal duct pressure, if the duct pressure is high, as in the example, the decrease in flow overshoots the desired flow and becomes unstable and oscillates about the desired flow.

Figure 5:
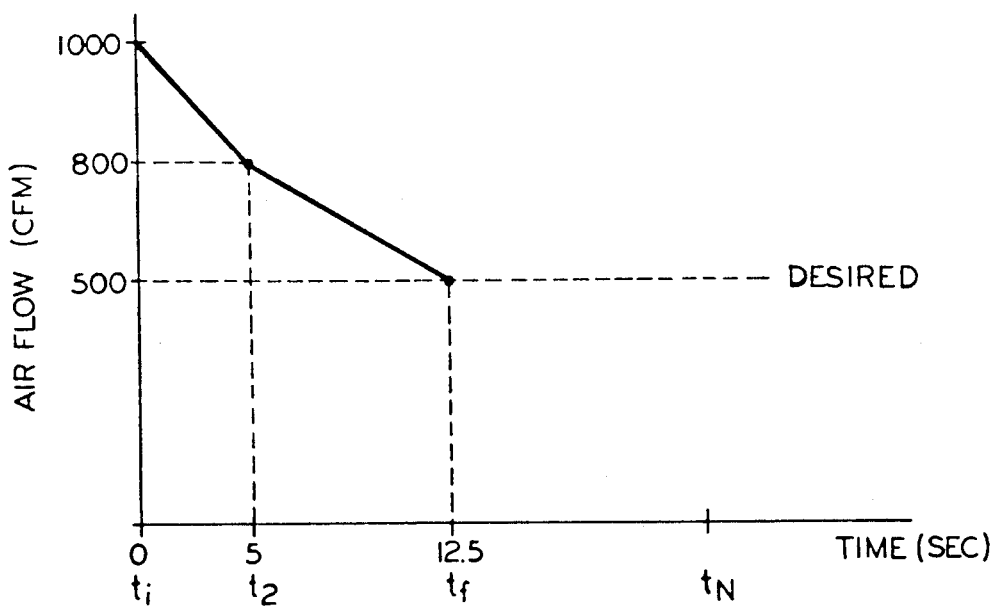
FIG. 5 is a graph showing the relation of air flow to time through an air damper employing the present invention.

The operation of the present invention, which prevents the oscillations shown in FIG. 4, is fully explained in FIG. 5. Assume that the initial flow is 1000 cfm and the desired flow is 500 cfm. The damper begins to close at an initial time ($t_i$) continues to close until a predetermined time ($t_2$). The terminal control unit 18 calculates the change in flow (dF) over the predetermined period of time ($t_2-t_i$), i.e. $(1000-800)/(5-0)=40$ cfm per second. Accordingly the terminal control unit, using the algorithm $T=\text{Error}/K$ as set forth above, then determines that the damper must operate for another 7.5 seconds, i.e. $(800-500)/40$, to reach the desired flow, and control the closing of the damper for the exact determined time. Thus, applicants have recognized that the change in flow through a terminal, per unit time, is sensitive to static pressure within the duct, but that the actual time to control a damper from an actual flow condition (cfm) to a desired setpoint flow condition (cfm) can be determined by dividing the difference between the desired setpoint and the actual flow by an initial change in flow per time.

Figure 6:
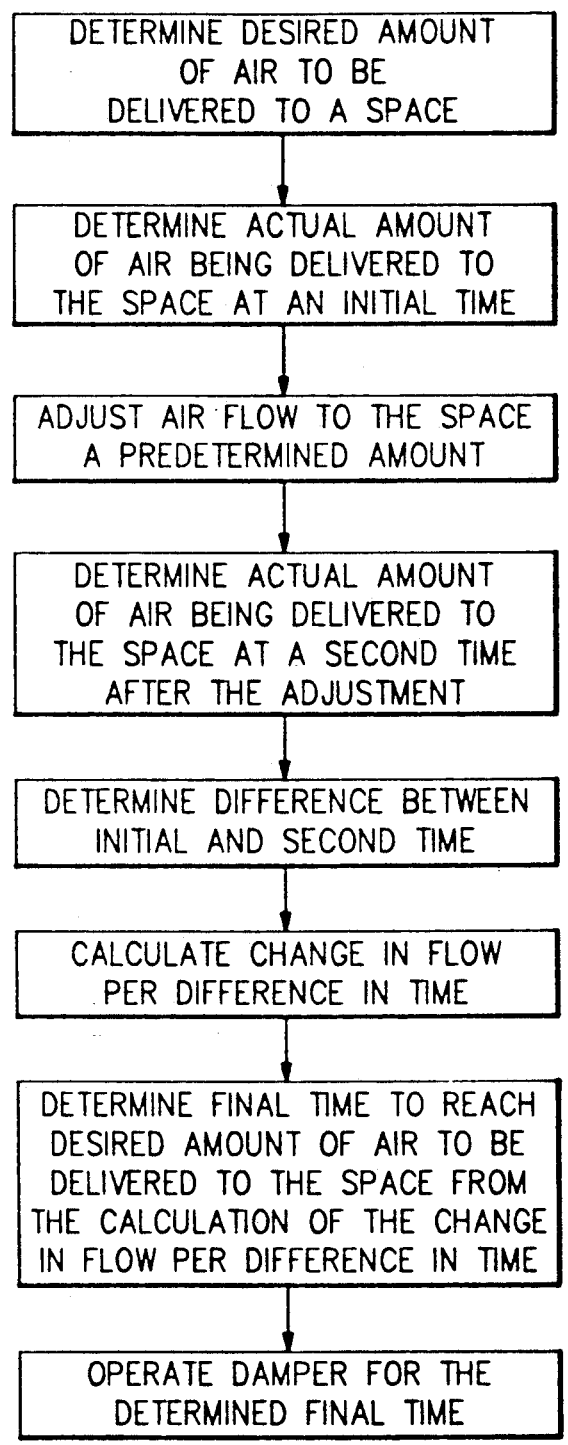
FIG. 6 is a flow chart of an air terminal adjustment of the present invention.

Referring now to FIG. 6, there is shown a flow chart for a method of determining the length of time of adjustment of an air terminal apparatus to control a desired flow of conditioned air to a space to be conditioned as the static pressure in the supply plenum varies in accordance with the present invention.

While the invention has been described in detail with reference to the illustrative embodiments, many modifications and variations would present themselves to those skilled in the art.

What is claimed is:

1. A method for determining the length of time of adjustment of an air terminal apparatus to control a desired flow of conditioned air to a space to be conditioned as the static pressure in a supply plenum varies, comprising:

determining a desired amount of conditioned air flow to be delivered to the space to be conditioned;

determining the actual initial conditioned air flow amount being delivered to the space to be conditioned at an initial time; adjusting the flow of conditioned air through a damper of the air terminal apparatus a predetermined amount;

determining the actual conditioned air flow amount being delivered to the space to be conditioned at a second time after adjusting the flow said predetermined amount;

determining the difference between the actual initial conditioned air flow amount being delivered to the space to be conditioned and the predetermined amount of conditioned air delivered at said second time;

determining the difference in time between the initial time and the second time;

calculating the change in flow per unit time between the difference between the actual initial flow amount and the predetermined flow amount, and the initial time and the second time;

determining the final time to reach the desired amount of conditioned air to be delivered to the space to be conditioned from the calculation of the change in flow per unit time; and operating said damper at the adjusted flow until the final time to satisfy a desired condition in the space to be conditioned.

2. A method as set forth in claim 1 wherein the final time is calculated according to the relationship:

$$T = \frac{\text{(Actual Initial Flow} - \text{Desired Flow)}}{\text{Change in flow per unit time}}$$

wherein T is the final time.

* * * * *